United States Patent [19]

Catena et al.

[11] Patent Number: 5,124,412
[45] Date of Patent: Jun. 23, 1992

[54] BLOCK COPOLYMER FROM CARBOXY TERMINATED POLYAMIDE AND POLYOL

[75] Inventors: Robert J. Catena, Orange; Albert A. Kveglis, Pine Brook, both of N.J.

[73] Assignee: Sun Chemical Corporation, Fort Lee, N.J.

[21] Appl. No.: 614,543

[22] Filed: Nov. 16, 1990

Related U.S. Application Data

[63] Continuation-in-part of Ser. No. 381,628, Jul. 18, 1989, abandoned.

[51] Int. Cl.⁵ .............................................. C08G 69/34
[52] U.S. Cl. .................. 525/420.5; 528/292; 528/332; 528/335; 562/509
[58] Field of Search .............. 525/420.5; 528/292, 528/332, 335; 260/404.5

[56] References Cited

U.S. PATENT DOCUMENTS

| | | | |
|---|---|---|---|
| 2,997,462 | 8/1961 | Wulff et al. | 528/292 |
| 4,208,493 | 6/1980 | Deleens et al. | 528/292 |
| 4,350,535 | 9/1982 | Ishijima et al. | 106/308 Q |
| 4,704,165 | 11/1987 | Nakamura et al. | 106/308 M |
| 4,873,311 | 10/1989 | Bornack et al. | 525/420.5 |

*Primary Examiner*—Harold D. Anderson
*Attorney, Agent, or Firm*—Jack Matalon

[57] ABSTRACT

A carboxy acid-terminated polyamide is reacted with an alkylene glycol, a polyalkylene glycol, nitrogen base or an alkanol amine (followed by an alkanoic acid) to provide a block copolymer. These block copolymers are especially useful as pigment dispersants, i.e. for preparing solvent-based packaging inks (i.e. packaging gravure and flexographic inks).

7 Claims, No Drawings

BLOCK COPOLYMER FROM CARBOXY TERMINATED POLYAMIDE AND POLYOL

This is a continuation in part of copending application Ser. No. 07/381,628 filed on Jul. 18, 1989, now abandoned.

BACKGROUND OF THE INVENTION

1. Field of the Invention:

The present invention relates to block copolymers useful as pigment dispersants.

2. Description of the Related Art:

Pigment dispersants have been used to improve the properties of inks. In general, dispersants promote the dispersion of the pigment in the ink and stabilize the dispersion. Lecithin is an example of such a dispersant.

U.S. Pat. No. 4,704,165 to Nakamura et al discloses an example of another dispersant. This patent discloses a phosphate ester pigment dispersant for organic, inorganic and extender pigments in compositions wherein the pigment is present in high concentrations as a coloring agent (printing inks, paints, coating agents and synthetic resins) and compositions useful as a paint.

U.S. Pat. No. 4,350,535 to Ishijima et al also discloses a phosphate ester dispersant that improves the long-term storage stability of aqueous coating compositions and adhesives containing a metallic powder pigment.

SUMMARY OF THE INVENTION

It is an object of the present invention to provide novel block copolymers useful as pigment dispersants. These dispersants are especially useful for preparing solvent-based packaging inks (i.e. packaging gravure and flexographic inks).

It is a further object of the invention to provide pigment dispersions containing the compounds, as well as packaging inks prepared from such dispersions.

These objects are achieved by providing the reaction product of a carboxyl acid-terminated polyamide and either an alkylene glycol, a polyalkylene glycol, a nitrogen base, or an alkanol amine (followed by neutralization with an alkanoic acid). The carboxyl acid-terminated polyamide is preferably the reaction product of a dimer acid and a tall oil fatty acid with an alkylene diamine, preferably ethylene diamine. The polyalkylene glycol is preferably polypropylene glycol. The reaction (at reaction temperatures of 140°-300° C.) of the polyamide with the alkylene glycol or polyalkylene glycol provides a nonionic block copolymer, while the reaction (at reaction temperatures of up to 100° C.) with the nitrogen base provides an anionic block copolymer, and reaction (at reaction temperatures of 140°-300° C.) with the alkanol amine and neutralization with the alkanoic acid provides a cationic block copolymer. A pigment dispersion comprising a pigment, the block copolymer (nonionic, anionic or cationic) and a dispersion vehicle as well as a solvent-based packaging ink comprising the pigment dispersion and a film-forming letdown varnish are also provided. The pigment may be any type that is useful for solvent-based packaging inks. Representative non-limiting examples of suitable pigments include Red Lake C, BON Red, Lithol Rubine, Permanent Red 2B, Naphthol Reds, Phthalocyanine Blue, Phthalocyanine Green, Monoarylide Yellows, Diarylide Yellows, Carbon Black, and the like. Generally, the reaction product is utilized in an amount of up to about 10 wt. %, preferably up to about 5 wt. %, based on the weight of the pigment dispersion.

DETAILED DESCRIPTION OF THE PREFERRED EMBODIMENTS

A carboxyl acid-terminated polyamide reacted with a reactant to provide either a nonionic, anionic or cationic block copolymer has been found to be an excellent dispersant for dispersing pigments in a variety of vehicles. The resultant pigment dispersions are especially useful for the preparation of solvent-based packaging inks (i.e., packaging gravure and flexographic inks). Such inks exhibit improved gloss, strength and transparency when printed on polymeric packaging such as high slip polyethylene, compared to inks prepared without dispersants of the present invention.

The carboxyl acid-terminated polyamide is preferably formed by reacting a dimer acid (preferably a $C_{36}$ dimer acid) and tall oil fatty acid with alkylene diamine to an acid value of between about 60 to 70. The dimer acid can be represented by the following formula:

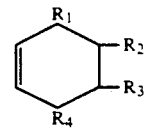

The particular components of the $R_1$-$R_4$ moieties (which contain 5-14 carbon atoms) are governed by the type of condensation used to prepare the dimer acid. If head-to-head condensation took place, adjacent R groups (ex. $R_1$ and $R_2$, or $R_3$ and $R_4$) are terminated in carboxyl groups while the other two adjacent groups will be hydrocarbon terminated. If head-to-tail condensation took place, the R groups alternate in terminating carboxyl and hydrocarbon groups. The carboxy-terminating groups can have structures such as: $-(CH_2)_8COOH$, $-CH=CH(CH_2)_8COOH$, $-(CH_2)_7COOH$, $-CH_2CH=CH(CH_2)_7COOH$, etc. and the hydrocarbon-terminating group can be represented by: $CH_3(CH_2)_4-$, $CH_3(CH_2)_5-$, $CH_3(CH_2)_7-$, $CH_3(CH_2)_4CH=CH-$, etc. The dimer acid is preferably Dimer 18 manufactured by Chemtall located in Riceboro, Ga. This dimer acid contains 83% dimer acid and 17% trimer acid species.

The tall oil fatty acid is preferably Sylfat 95 manufactured by Sylvachem located in Panama City, Fla. A typical tall oil fatty acid is a mixture of fatty acids such as stearic acid, oleic or linoleic acid, rosin acids, and unsaponifiable materials.

The alkylene diamine is preferably ethylene diamine. Other alkylene diamines may be used.

The reaction product of the dimer acid, tall oil fatty acid and alkylene diamine is reacted with either: an alkylene glycol or polyalkylene glycol to provide a nonionic block copolymer; a nitrogen base to provide an anionic block copolymer; or an alkanol amine (followed by neutralization with an alkanoic acid) to provide a cationic block copolymer.

Preferably, the polyalkylene glycol is polypropylene glycol. The number average molecular weight range of useful polypropylene glycols lies between about 192 and 1,050, corresponding to molecules containing 3 to 18 ether oxygen atoms; preferably the molecule will contain 3 to 6 ether oxygen atoms. The nitrogen base is preferably an amine, most preferably ammonium hydroxide or methyldiethanol amine. The alkanol amine and alkanoic acid are preferably methyldiethanol amine and propionic acid, respectively. Of the three classes of block copolymers (nonionic, anionic and cationic), the nonionic block copolymer is preferred.

The reaction ratios to provide the acid terminated polyamide backbone are about 0.6-1.0 equivalent dimer acid to about 0.5-0.9 equivalent tall oil fatty acid to about 0.7-1.0 equivalent ethylene diamine. About 0.5 carboxyl equivalent of the polyamide is reacted with either about 0.5 equivalent of alkylene glycol or about 0.5 equivalent of polypropylene glycol, about 0.50 equivalent of ammonium hydroxide or methyldiethanol amine, or about 0.125 equivalents of methyldiethanol amine followed by 0.125 equivalents of methyldiethanol amine followed by 0.125 equivalents of propionic acid. Useful nonionic block copolymers will have an acid value between about 20 and 5, preferably between 15 and 10, and a number average molecular weight of about 2200 to 3800, preferably 2220 to 2300.

The following structures generally illustrate the three classes of block copolymers prepared in accordance with the invention:

The solvent(s), i.e., the dispersion vehicles(s), may be any of those typically used to prepare pigment dispersions useful for solvent-based packaging inks. The solvent(s) is (are) generally utilized in amounts of about 20-60 wt. %, based on the weight of the dispersion. Suitable solvents include $C_1$-$C_7$ straight or branched chain alkyl, aryl or heterocyclic alcohols, esters or hydrocarbons such as isopropanol, ethyl acetate, n-heptane, n-hexane, toluene, cyclohexane, etc. As a general rule, such solvents will have boiling points of up to about 120° C.

The solvent-based packaging ink is readily prepared by mixing the pigment dispersion with a film-forming letdown varnish such as nitrocellulose, polyamides, ketone resins, acid-modified rosin esters, polyvinyl butyral and the like. As a general rule, about 40 to 70 parts of the dispersion will be mixed with 100 parts of the varnish together with optional adjuvants such as extenders, waxes, opacifiers, antioxidants, etc. The finished ink will typically contain 10-30 wt. % pigment, based on the weight of the ink.

The following Examples 1-6 generally illustrate how a block copolymer and a pigment composition in accor-

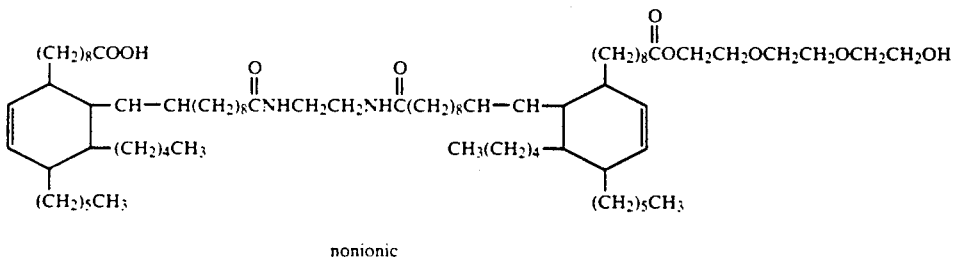

nonionic

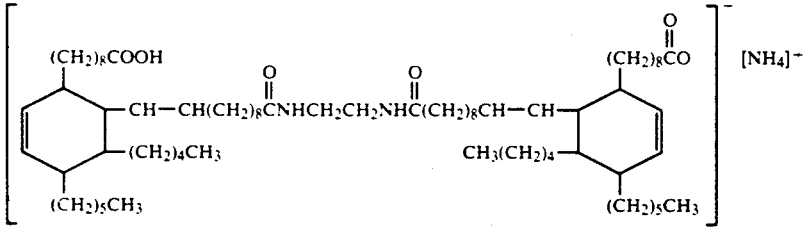

anionic

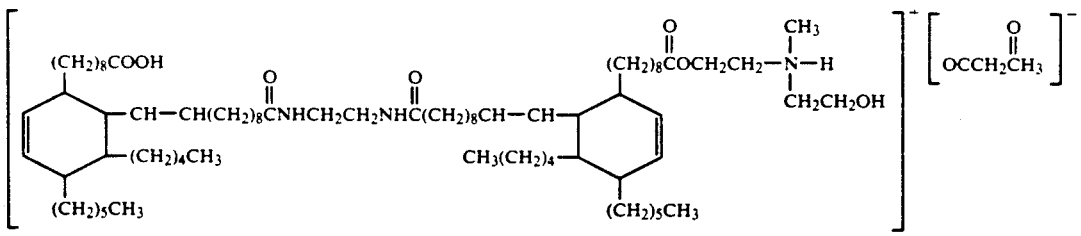

cationic

The pigment dispersion is readily prepared by conventional methods (e.g., a 3-roll mill) in which pigment, solvent(s) and block copolymer are combined. As a general rule, the block copolymer will comprise not more than about 10 wt. %, preferably not more than 5 wt %, based on the weight of the dispersion. The pigment may be any type that is useful for solvent-based packaging inks such as those listed above and is typically present in an amount of about 30 to 70 wt %, based on the weight of the dispersion.

dance with the invention may be prepared. Example 1 illustrates preparation of a nonionic block copolymer. Example 2 illustrates preparation of a cationic copolymer. Example 3 illustrates preparation of an anionic copolymer. Example 4 illustrates an ink formulation prepared using the block copolymer of Example 1. Example 5 illustrates in tabular form the components of several additional ink formulations prepared utilizing the block copolymer of the invention. Example 6 is to the same effect as Example 5, except the pigment is carbon black.

EXAMPLE 1

(Nonionic Block Copolymer)

259.9 parts of a dimer acid (Chemtall C36-18) and 177.3 parts of a tall oil fatty acid (Sylfat 95-Sylvachem) were charged into a 4-neck 1 liter round bottom flask equipped with a reflux condenser, mechanical agitator, thermometer, and nitrogen blanket. The contents were heated to 60° C. where 30.0 parts of ethylene diamine were added slowly through an addition funnel over 5 minutes. The temperature was raised to 115° C., held for 1 hour, and was then increased to 200° C. and held for 1 hour while removing water of reaction as it was formed. The batch was cooled to 140° C. and 262.2 parts of a polypropylene glycol (Pluracol 1010-BASF) were added slowly through an addition funnel over 20 minutes. The temperature was gradually increased to 270° C., removing water of reaction as it was formed. When an acid value below 8.0 was obtained, the batch was cooled to 200° C. and discharged. Forty parts of this batch were combined with 48 parts n-heptane and 12 parts of n-butanol in a 4-neck, 1 liter flask equipped as described above. The contents were heated to 70° C. until the resin was completely solubilized. It was then cooled to 30° C. and discharged.

EXAMPLE 2

(Cationic Block Copolymer)

The procedure of Example 1 was repeated up to the addition of the polypropylene glycol. At this point, 44.4 parts of methyldiethanol amine were added and the contents slowly heated to 250° C., removing water of reaction as it was formed. An acid value of 4.2 and amine value of 25.2 were obtained after 2 hours. The batch was cooled to 100° C. and 15.5 parts of propionic acid were added. The reaction was held for 30 minutes and discharged.

EXAMPLE 3

(Anionic Block Copolymer)

The procedure of Example 1 was repeated up to the addition of the polypropylene glycol. At this point, the batch was cooled to 100° C. with 63.5 parts of methyldiethanol amine being added. The material was held for 30 minutes at 100° C.

EXAMPLE 4

(Ink Formulation)

25.0 parts of a varnish consisting of 40% (wt.) Example 1 block copolymer, 48% heptane, and 12% n-butanol, 1.0 part heptane, 13.0 parts n-propylacetate and 10.0 parts n-butanol were added together and placed in an attriter. To this was added 1.0 part lecithin and 50.0 parts cyan blue pigment. This was milled until no seed or scratches were observed on a grind gauge. This portion is called pigment dispersion or the base. To 31.8 parts of this base were added 3.0 parts of a high viscosity nitrocellulose, 4.7 parts of an alcohol soluble nitrocellulose, 1.0 part dioctylphthalate, 4.0 parts of a wax compound, 1.0 part of a silicone solution, 1.0 part of a citric acid solution, 38.2 parts of a polyamide solution, 2.0 parts n-propanol, and 13.3 parts ethanol. They were mixed in a blender for 10 minutes. The ink had an uncut viscosity of 30 seconds on a number 3 Zahn cup. The ink was cut with a 90/10 (wt.) n-propanol to n-propylacetate mixture and printed with a 165 anilox hand proofer on high slip polyethylene film. The prints exhibited superior gloss, transparency, and strength compared to a standard polyamide/nitrocellulose ink prepared without the block copolymer.

EXAMPLE 5

(Additional Ink Formulations)

The following pigment dispersions were prepared utilizing the block copolymer of the invention. The compositions were as follows:

| Dispersion Component | Percentage (wt.) of dispersion | | |
|---|---|---|---|
| Example 1 copolymer | 25.0 | 25.0 | 25.0 |
| Heptane | 1.0 | 1.0 | 1.0 |
| n-Propylacetate | 13.0 | 13.0 | 13.0 |
| n-Butanol | 10.0 | 10.0 | 10.0 |
| Lecithin | 1.0 | 1.0 | 1.0 |
| AAOT Yellow Pigment | 50.0 | — | — |
| BON Red Pigment | — | 50.0 | — |
| Phthalo Blue Pigment | — | — | 50.0 |

These dispersions were letdown to inks in the following manner:

| Ink Component | Percentage (wt.) of Ink | | |
|---|---|---|---|
| Yellow Dispersion | 33.5 | — | — |
| Red Dispersion | — | 32.7 | — |
| Blue Dispersion | — | — | 31.8 |
| Nitrocellulose S.S. | — | — | 3.0 |
| Nitrocellulose A.S. | 7.6 | 7.3 | 4.7 |
| Dioctylphthalate | — | 1.0 | 1.0 |
| Waxes | 4.0 | 4.0 | 4.0 |
| Citric Acid Solution | 1.0 | 1.0 | 1.0 |
| Silicone Solution | 1.0 | 1.0 | 1.0 |
| SK 1487 (polyamide) | 8.9 | — | — |
| Polyamide Solution | 44.0 | 34.3 | 38.2 |
| Ethanol | — | 34.3 | 13.3 |
| n-Propylacetate | — | 2.5 | — |
| Heptane | — | 4.5 | — |
| i-Propanol | — | 3.3 | — |
| n-Propanol | — | — | 2.0 |

The inks were cut to printing viscosity with 90/10 n-propanol/n-propylacetate and printed on high slip polyethylene. Inks made from the above bases are superior in strength, gloss and transparency than equivalent dry grind base standards without the dispersant of the invention.

EXAMPLE 6

A solvent-based packaging ink was prepared in the same manner as in Example 5, using carbon black as the pigment. The pigment dispersion was prepared from the following components:

| Dispersion Component | Percentage (wt.) of dispersion |
|---|---|
| Example 1 copolymer | 14.2 |
| Heptane | 26.7 |
| n-Butanol | 7.0 |
| Lecithin | 2.0 |
| Carbon Black | 50.0 |

The resultant dispersion was letdown to an ink in the following manner:

| Ink Component | Percentage (wt.) of ink |
| --- | --- |
| Dispersion | 33.5 |
| Nitrocellulose A.S. | 7.6 |
| Wax | 4.0 |
| Citric Acid Solution | 1.0 |
| Silicone Solution | 1.0 |
| SK 1487 (polyamide) | 8.9 |
| Polyamide Solution | 44.0 |

The ink was cut to printing viscosity with 90/10 n-propanol acetate and printed on high-slip polyethylene. The results were comparable to those achieved in Example 5.

While certain representative embodiments and details have been shown for the purpose of illustrating the invention, it will be apparent to those skilled in this art that various changes may be made therein without departing from the spirit of scope of the invention.

What is claimed is:

1. The block copolymer of (a) a carboxylic acid-terminated polyamide prepared by reacting a dimer acid and a tall oil fatty acid with an alkylene diamine and (b) a comonomer selected from the group consisting of an alkylene glycol and a polyalkylene glycol.

2. The block copolymer of claim 1 wherein the alkylene diamine is ethylene diamine.

3. The block copolymer of claim 1, wherein the dimer acid has the general formula

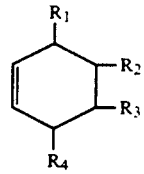

wherein $R_1$ and $R_2$ represent carboxy-terminating groups containing 5 to 14 carbon atoms and $R_3$ and $R_4$ represent hydrocarbon-terminating groups containing 5 to 14 carbon atoms, or $R_1$ and $R_2$ represent said hydrocarbon-terminating groups and $R_3$ and $R_4$ represent said carboxy-terminating groups.

4. The block copolymer of claim 1, wherein the dimer acid has the general formula

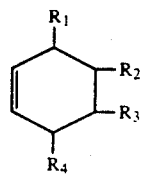

wherein $R_1$ and $R_3$ represent carboxy-terminating groups containing 5 to 14 carbon atoms and $R_2$ and $R_4$ represent hydrocarbon-terminating groups containing 5 to 14 carbon atoms, or $R_1$ and $R_3$ represent said hydrocarbon-terminating groups and $R_2$ and $R_4$ represent said carboxy-terminating groups.

5. The block copolymer of claim 1, wherein the comonomer is a polyalkylene glycol.

6. The block copolymer of claim 5, wherein the polyalkylene glycol is a polypropylene glycol comprised of molecules containing 3 to 18 ether oxygen atoms.

7. The block copolymer of claim 1, having an acid value of between about 20 and 5 and a number average molecular weight of about 2200 to 3800.

* * * * *